Feb. 5, 1952     E. D. POWELL     2,584,917
LEVEL
Filed Oct. 9, 1950
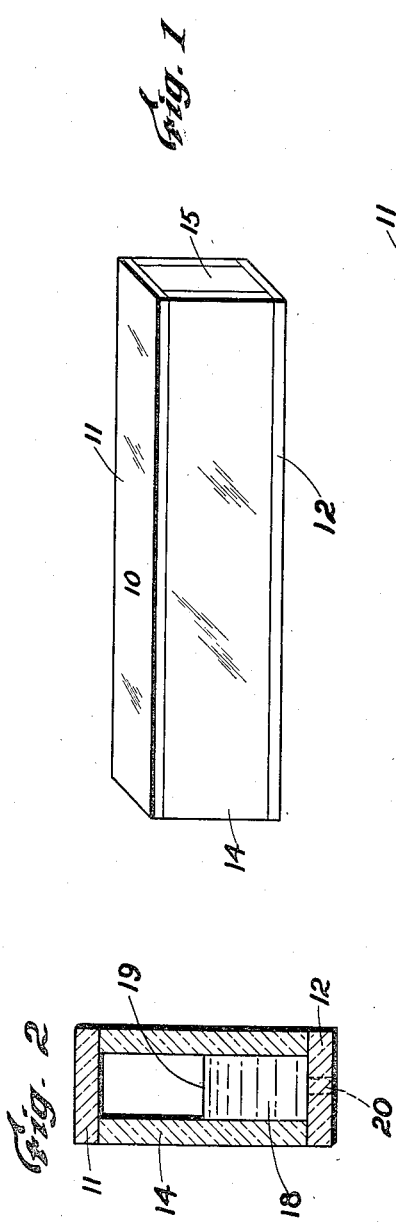
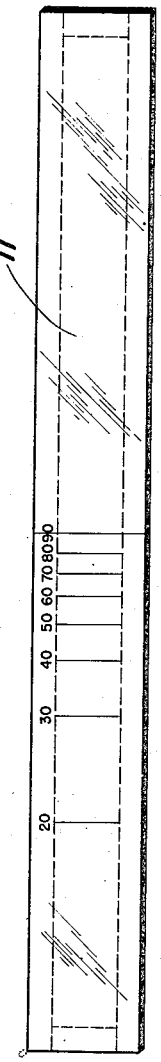
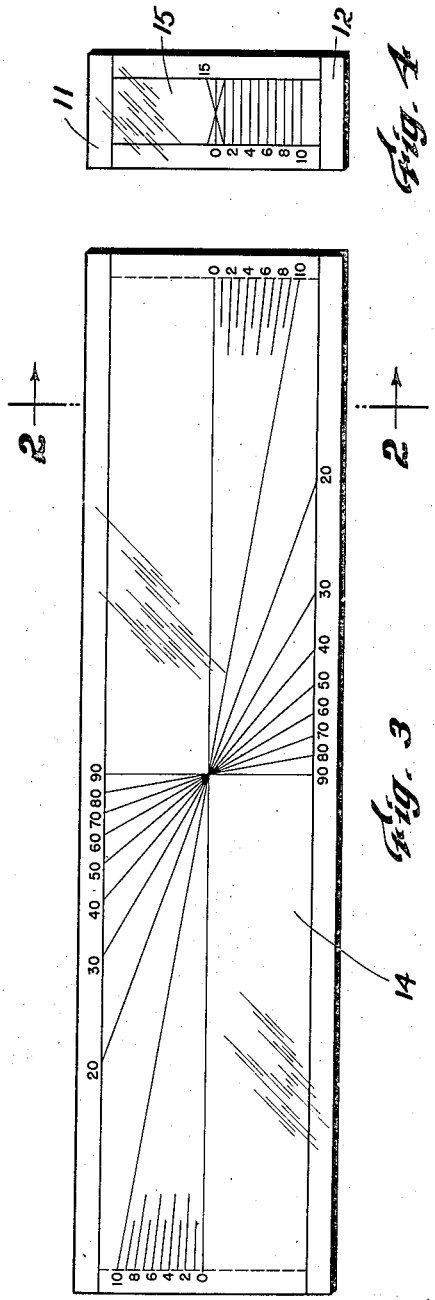
Edward D. Powell
Inventor
by James R. Hodder
Attorney Patented Feb. 5, 1952

2,584,917

UNITED STATES PATENT OFFICE 2,584,917

LEVEL

Edward D. Powell, Middleboro, Mass.

Application October 9, 1950, Serial No. 189,115

2 Claims. (Cl. 33—206)

My present invention relates to a novel and improved leveling instrument particularly adapted as a multi-purpose tool for determining the true level or the exact degree of inclination of any surface to which it may be applied.

My device pertains to that general type of levels wherein a suitable fluid or liquid body is employed to indicate the level or inclination of a surface, and is especially characterized by having the stock containing the level-disclosing liquid formed of a transparent synthetic plastic material such as Lucite, Plexiglas, glass or other transparent material, or the like, suitably provided with graduated scale markings on the visible portion thereof, whereby the exact angle of any surface may be quickly and accurately determined.

I have found that such plastic material is ideally suited as stock means for such instruments as it is durable, possesses transparent qualities, may be accurately made, may be sealed by fusing once the fluid is contained therein, and may be readily and distinguishingly marked.

I am aware that heretofore leveling tools have been devised in which transparent liquid-containing inserts or receptacles have been incorporated and wherein graduated scales have been employed to show the degree of inclination involved, but as far as I am informed none of these prior levels have included such important features as universal transparency which affords more ease and greater accuracy in reading, and which enables all surfaces other than the surface-engaging base to be provided with degree indications so that accurate measurements may be readily obtained pertaining to the vertical and horizontal inclination of any given surface.

My improved device is also particularly desirable in leveling and plumbing operations which must be performed in cramped or restricted space, as it is very convenient to read since the level is shown on the top, sides, and ends thereof, and therefore the required information is obtainable without difficulty.

Further features, objects, and details of construction will be hereinafter more fully pointed out in the accompanying description and more clearly defined in the appended claims.

Referring now to the drawings wherein I show a preferred embodiment of my invention:

Fig. 1 is a perspective view of my transparent container;

Fig. 2 is a cross-sectional view on the line 2—2 of Fig. 3;

Fig. 3 is an enlarged side-elevational view of my level;

Fig. 4 is an end view of the same, and

Fig. 5 is a top plan view of the same.

In the drawings, the numeral 10 designates generally my container or fluid-holding receptacle which is composed of a plurality of transparent plastic sections appropriately fused into a hollow rectangular unit comprising a top portion 11, bottom 12, sides 14—14, and end portions 15—15. The top 11 and bottom 12 are made perfectly straight and in parallel relation to each other, while the sides and end portions 14—14 and 15—15 are prepared at right angles to said top 11 and bottom 12.

As clearly indicated in Figs. 3, 4, and 5, I have applied complemental scale markings to the top surface 11, sides 14—14, and both ends 15—15, such markings being readily imprinted or otherwise reproduced on said surfaces. Such markings consist of a level or zero line extending longitudinally thru the center of the sides 14 and the ends 15 parallel to the top 11 and bottom 12 and a 90—90 line extending at right angles to said zero line, and bisecting the sides 14 and top 11. Between said 0—0 lines and said 90—90 lines on the sides 14 are radially extending degree lines, as shown in Fig. 3, indicating an angular pitch of from 1° to 80°. The scale is preferably arranged with the degree markings between 0 and 90 on the upper portion of the side 14 on one-half thereof, and on the lower portion on the other half thereof to facilitate the reading of a liquid level 19, making it possible for the pitch of the same to be determined from either end of each side 14.

On each end 15 I have arranged transverse degree markings from the zero or level line for each degree up to 10 in complemental relation to the similar markings below the zero line on the sides 14. In certain positions or circumstances, it may be most advantageous to determine the level or degree of pitch of any particular surface by making an end reading to effect the same, and such end markings will accordingly be useful.

As a means of determining an accurate measurement on the lateral degree of tilt or pitch of a surface to be trued, I may provide a series of diagonal indications on the ends 15, as illustrated by the 15 degree line in Fig. 4. Although I have shown this one line in the drawings, it is apparent that other similar lateral pitch designations could be included on the end portions 15 or top 11.

On the top 11, I prefer to include the transverse lines marked 20 to 90 in complemental relation to and in continuation of the corresponding designations on the upper portion of the sides 14. Such top scale is primarily adapted to indicate the widthwise inclination of the surface to be measured, if any, when the side scale is registering the lengthwise level or pitch. As is readily apparent, this function of the top scale may be relatively similar to that of the angular end scale. The surface of said top 11 will also prove advantageous in measuring the inclination of certain sloping or decidedly steep surfaces.

Any suitable non-freezing fluid or liquid 18 may be used in my container 10, preferably appropriately colored so that it may be more readily distinguished therein and applied thereto thru a small opening in the base 12 and sealed thereby by any desired means, such as a fusible plug 20.

Such fluid 18 is easily administered to the container with the same tilted on an end 15 in an amount equal in volume to the cubic content of one-half said container or to a level corresponding to the 90—90 central line. Once the liquid 18 is sealed within the container 10 by the fusing of the plug 20, the container is seated on its base 12, thereby causing the fluid 18 to exactly fill one-half of the container longitudinally with its level line 19 coinciding with the 0—0 line on each side 14 and each end 15.

As my leveling tool, thus formed, is applied to any surface to be trued, the liquid level 19 will coincide with the 0—0 line, if the surface is level; or if out of level, the degree of lengthwise pitch will be registered on each side 14 and the widthwise inclination will be indicated on the top 11 and end portion 15, such reading being readily made thru the transparent sections of the container 10.

Although I have illustrated the scale indications on a partial portion of the side, end, and top surfaces, it is apparent that further markings could be provided thereon, or that any measuring arrangement could be utilized with equally satisfactory results, and without departing from the spirit of the invention.

From the foregoing, therefore, it will be seen that I have devised a novel and improved multi-purpose leveling instrument of simple design and inexpensive to produce and which can be of any size and capacity, and which is particularly characterized by a plurality of transparent surfaces on a rectangular container, appropriately marked with the scale indications to register the level or the exact inclination of a surface as indicated by a gravity fluid sealed within the container.

I claim:

1. A universally transparent contact leveling instrument of the kind described, comprising an elongated rectangular container composed of transparent planar top, side, end and bottom panels, said top, bottom or either end panel selectively serving as a base for said level when in use, said container holding an indicating fluid filling one-half the volume of the container, fluid angle indicating lines radiating from a central zero point on each of said side panels and intersecting the side edges of said panels, and complemental indicating lines on said top and end panels joining the ends of corresponding, opposite radial indicating lines on the two side panels, whereby the angle of a given surface may be accurately read from any desired viewing angle and said instrument may be leveled from front to back for accurate fluid level indicating by the radial lines.

2. A universally transparent contact leveling device of the kind described, comprising an elongated rectangular container composed of transparent planar top, side, end and bottom panels, said top, bottom or either end panel selectively serving as a base for said level when in use, said container holding an indicating fluid filling one half the volume of the container, fluid angle indicating lines radiating from a central zero point on each of said side panels and intersecting the side edges of said panels, complemental indicating lines on said top and end panels joining the ends of corresponding opposite radial indicating lines on the two side panels, and fluid angle indicating lines radiating from a central zero point on each of said end panels, said radial and complementary indicating lines thereby affording use of the instrument for reading levels in two directions, said readings being accurately made from any viewing angle.

EDWARD D. POWELL.

REFERENCES CITED

The following references are of record in the file of this patent:

UNITED STATES PATENTS

| Number | Name | Date |
|---|---|---|
| 25,446 | Scoville | Sept. 13, 1859 |
| 1,267,049 | Boos | May 21, 1918 |
| 1,274,333 | Roland | July 30, 1918 |

FOREIGN PATENTS

| Number | Country | Date |
|---|---|---|
| 2,967 | Great Britain | 1886 |
| 332,391 | France | 1903 |
| 534,255 | Great Britain | 1941 |
| 550,278 | Germany | 1932 |
| 559,325 | Great Britain | 1944 |